Figure 1:
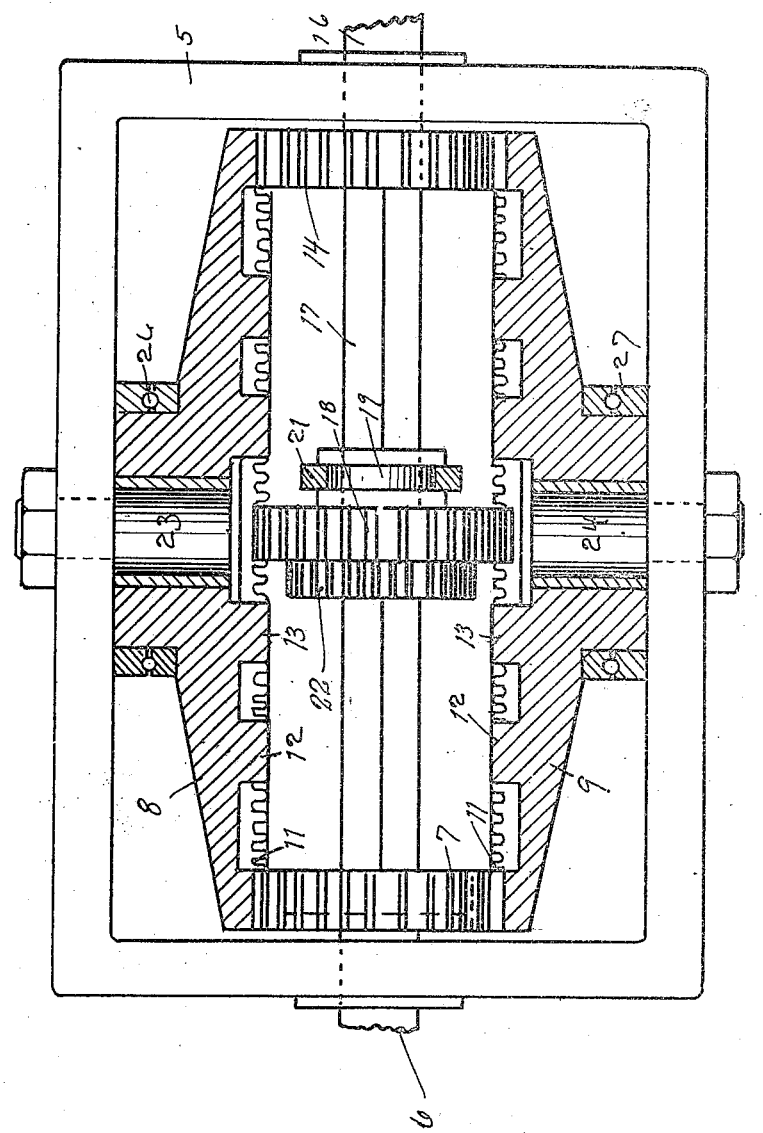

Dec. 13, 1927.

V. G. MORENO

GEAR SHIFT MECHANISM

Filed July 30, 1926

1,652,951

3 Sheets-Sheet 1

INVENTOR.
V G MORENO
BY Victor J. Evans
ATTORNEY.

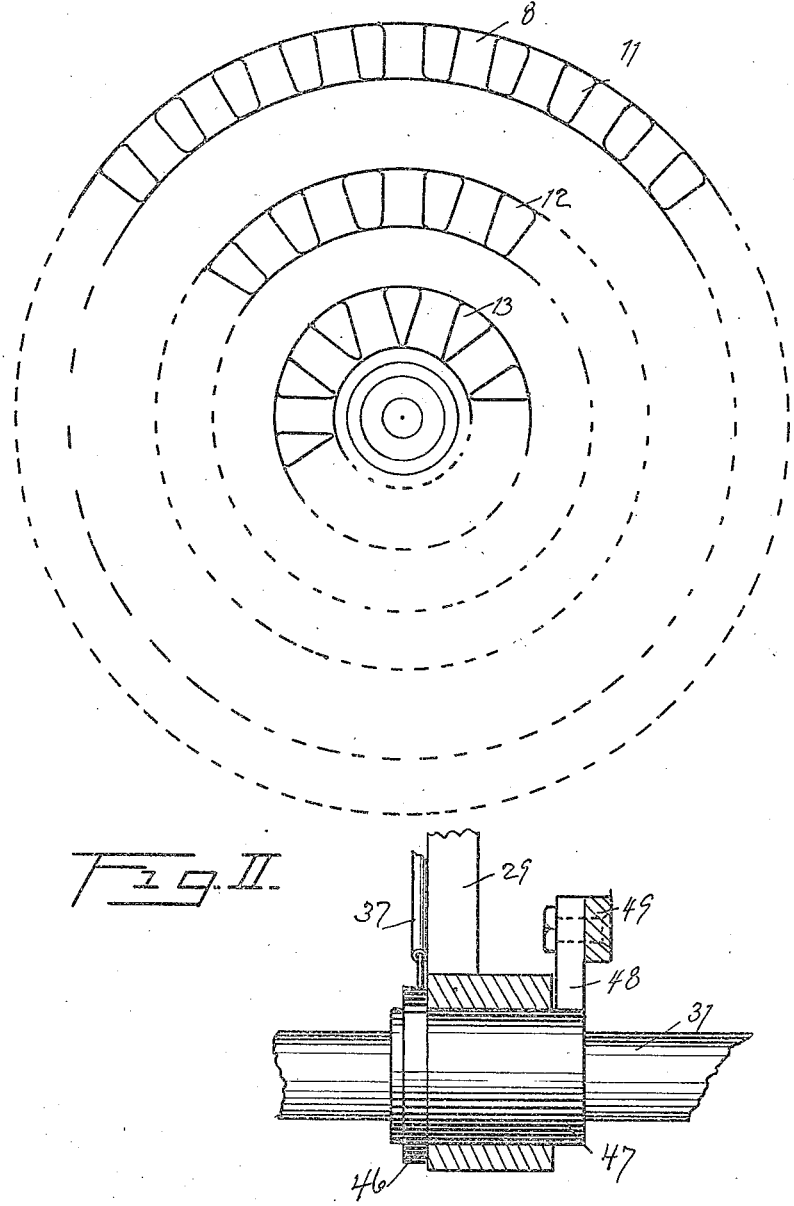

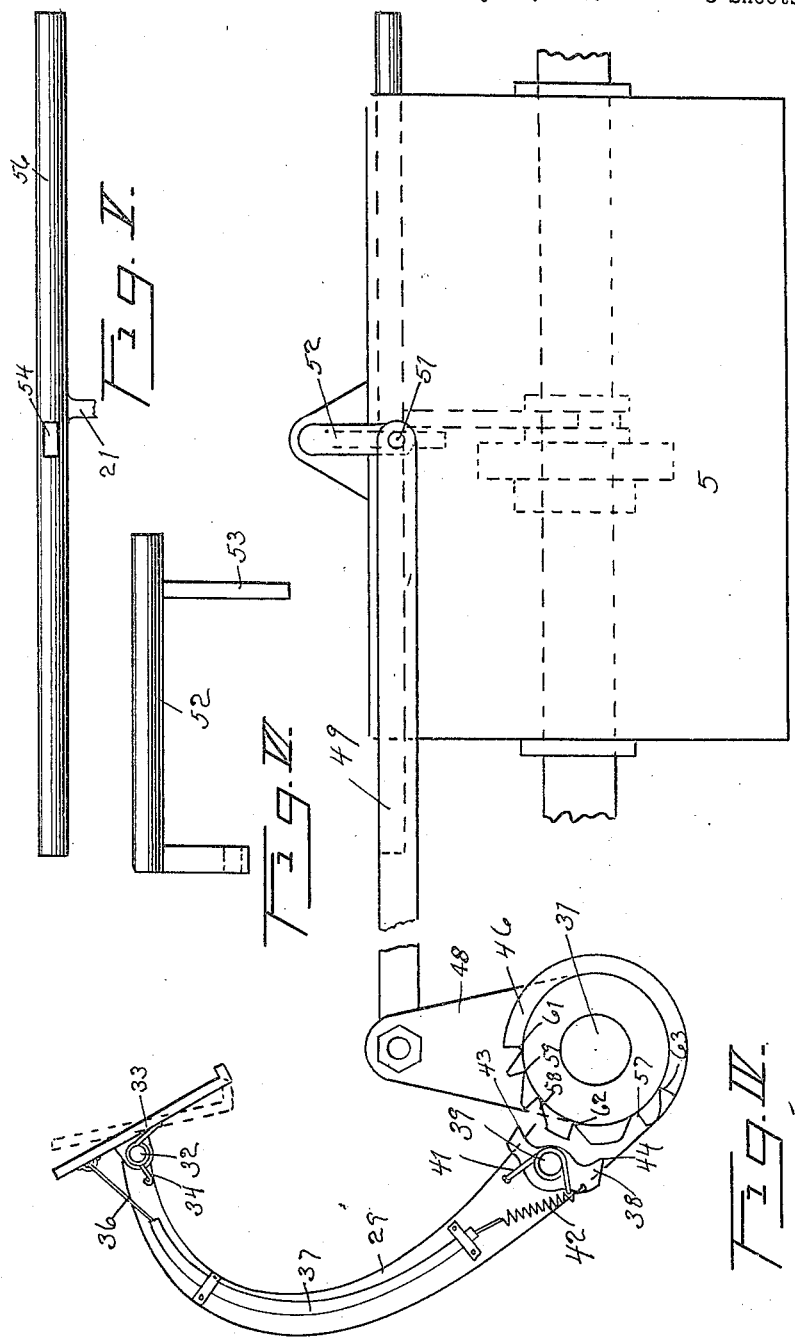

Patented Dec. 13, 1927.

1,652,951

UNITED STATES PATENT OFFICE.

VINCENTE GARCIA MORENO, OF ENSENADA, B. C., MEXICO.

GEAR-SHIFT MECHANISM.

Application filed July 30, 1926. Serial No. 126,020.

This invention relates to improvements in gear shift mechanisms and has particular reference to semi-automatic means for changing the gears in a transmission mechanism.

The principal object of this invention is to provide means whereby the gear ratio between a driving shaft and a driven shaft may be changed in a semi-automatic manner, thereby reducing the danger of stripping the gears as is often done.

Another object is to provide a means for shifting the gears which will eliminate the necessity of removing one of the hands from the steering wheel during the changing process.

An additional object is to eliminate the customary gear shift lever which might be accidentally moved by a child, thereby causing a run-a-way, providing the engine has been left running.

A still further object is to reduce the cost of manufacture of gear shifting mechanism as is commonly employed.

Other objects and advantages will be apparent during the course of the following description.

In the accompanying drawings forming a part of this specification and in which like numerals are employed to designate like parts throughout the same, Figure I is a horizontal cross section of my transmission having the cover removed therefrom, Figure II is a plan view of one of the disc gears employed in my transmission, Figure III is a fragmentary detail view showing the mounting of the rocker arm and segment upon the clutch pedal shaft, Figure IV is a side elevation of a transmission housing having my gear shifting mechanism attached thereto, Figure V is a plan view of the sliding gear shift bar, and Figure VI is a side elevation of the shifting yoke.

At the present time, in the shifting of gears, it is necessary for the operator of the device upon which the transmission mechanism is located to engage a handle for the purpose of moving into or out of engagement, one or more gears. In order to engage this handle, it is customary to look from the wheel to the lever, in order to quickly locate the same, thus removing the eyes from the road and, at the same time, removing one of the hands from the wheel, which, in a tight place is a dangerous process.

In the accompanying drawings wherein for the purpose of illustration is shown a preferred embodiment of my invention the numeral 5 designates a gear case, within which my transmission gears are located.

At 6, I have shown a driving shaft which is secured to a gear 7. This gear 7 meshes with two disc gears 8 and 9. Each of these disc gears has cut on the face thereof three sets of concentrically spaced teeth as shown at 11, 12 and 13.

A gear 14 is rotatably positioned on a shaft 16 and merely acts as an idler, which shaft is adapted to be driven from the shaft 6. This shaft 16 has a squared portion 17 upon which is slidably mounted a master gear 18, having formed integral therewith a collar 19 adapted to be engaged by a yoke 21.

Connected to the master gear 18 is a clutch member 22 adapted to be brought into internal engagement with internally formed teeth carried in the gear 7. The disc gears 8 and 9 are each mounted upon a stub shaft as shown at 23 and 24, respectively, while thrust bearings 26 and 27, respectively, take up the side thrusts of these disc gears.

Referring now to Figure IV, it will be noted that the numeral 29 refers to a clutch pedal pivotally supported upon a shaft 31. The upper extremity of this clutch lever has pivoted to its upper extremity, as at 32, a pedal 33, which is normally held in its full line position of this figure by a spring 34.

A cable 36 is connected to the pedal 33 and extends through a tube 37 to a point adjacent a dog 38, which is pivoted as at 39 upon the lever 29. A spring 41 normally tends to force the nose 44 of the dog into engagement with one of the notches of the ratchet 46 which spring action is however opposed by the spring 42. The spring 42 is interposed between the dog and the end of the wire 36 serves to connect these two elements together.

The dog 38 has a nose 43 and a nose 44, which noses are adapted to be moved into engagement with a ratchet 46 carried upon a sleeve 47 which sleeve is mounted upon the shaft 31. This sleeve has connected thereto a lever 48 to which a connecting rod 49 is pivoted. The opposite end of this connecting rod is pivoted as at 51 to the shifting yoke 52, which yoke is pivotally supported upon the upper surface of the gear case 5 and has a downwardly extending arm 53 which is adapted to extend through an opening 54 formed in the gear-shifting bar 56.

By again viewing Figure I and Figure II, it will be noted that the disc gears have their three sets of teeth cut at different diameters and that between each set of teeth there is a space corresponding to the length of the teeth of the master gear 18. These three sets of teeth give three speeds forward and reverse. By moving the master gear 18 toward the left of the drawing, the teeth 13 will correspond to low gear ratio, the teeth 12 will correspond to intermediate gear ratio and when the gear 22 comes into engagement with the internal teeth of the gear 7, the high speed ratio will occur.

By mounting the disc gears 8 and 9 as herein shown and by using an idler gear 14 which is of the same size as the gear 7 practically no side strain is placed upon the disc gears which are, therefore, free to rotate upon the pins 23 and 24, with the bearings 26 and 27, respectively, taking up the thrust of their respective disc gears.

In Figure II, it will be noted that the teeth of the disc gear are cut in such a manner as to give different shaped teeth, at their various diameters, the teeth having parallel adjacent faces, thus permitting the meshing of the master gear 18 with the teeth 11 and 12 and 13 on a full face, thus giving the proper distribution of strain upon the gear teeth and further by having two disc gears, engagement with the master gear is caused upon opposite sides thereof, which equalizes the strain in a manner superior to that employed in the usual transmissions in which case all the strain on the driven shaft is upon only one point of the gear.

Furthermore, on account of the shape of the teeth, the meshing of the gears will be practically noiseless.

Referring now to the operation and assuming that the same has been attached to a vehicle with the master gear in the neutral position of Figure I and it is desired to place the car under way, the first act will be to depress the lever 29 by bringing the foot into contact with the pedal 33. This act releases the clutch in the customary manner and, at the same time, a further depression of the lever permits the dog 38 to be forced down by the spring 41 until the nose 44 enters the ratchet notch 57, which imparts rotation to the collar 47 and link 49 to yoke 52. This yoke, in turn, causes the arm 53 to move the bar 56 from which the yoke 21 depends. This movement causes the master gear to move into engagement with the teeth 13 of the disc gears.

It is, of course, understood that the customary spring lock is provided in connection with the sliding bar 56 so as to hold the same in its adjusted position, thereby maintaining the gears in their proper meshed relation, the operator then immediately releases the clutch pedal and the car proceeds.

By again depressing the clutch lever slightly further than was done in the first shifting operation a second movement is realized which will cause the master gear to mesh with the teeth 11 of the disc gear and by then depressing the lever slightly further than was done in the second shifting operation, a third movement will be realized which will bring the clutch member 22 into engagement with the gear 7 which will be the high gear position.

In order to stop the car or move the master gear to neutral position, the operator presses upon the pedal 33 in such a manner as to rock the same to the dotted line position of Figure IV which results in a pull being delivered through the medium of the wire 36 to the spring 47 which overcomes the spring 41 and causes the nose 43 of the dog to engage one of the notches 58, 59 or 61. By now releasing the pedal the return action of the lever will impart rotation to the collar 47, which in turn through the link 49 and yoke 52 will cause the master gear to move to one of its neutral positions.

Should the master gear have been in high gear position and assuming that the nose 43 of the dog is engaging the notch 61, the neutral position of the master gear will then be between the teeth 11 and 12 of the disc gears. Therefore, it would take two more slight depressions and releasing of the pedal to return the master gear to the neutral position shown in Figure I.

When the driver wishes to reverse, he releases the clutch by forcing the lever 29 downwardly and by rocking the pedal 33 so as to bring the nose 43 of the dog into the notch 62. By now releasing the lever the same will return to its normal position and at the same time, transmit motion through the collar 47 and in the manner just described, sliding the master gear in reverse direction, or toward the right of the drawing in Figure I.

When it is desired to return to neutral position from reverse position, the driver pushes the lever in again in such a manner that the nose 44 of the dog will now engage the notch 63 with the result that upon further depression the collar 47 will be actuating thereby moving the master gear from reverse position to neutral position as shown in Figure I.

It will thus be seen that by simply pushing in and out on the clutch pedal, it is possible to change the gears either forward or reverse thereby eliminating the use of the ordinary gear shift lever. It is, of course understood, that the disc gears may be mounted either horizontally or vertically depending upon the amount of room available for the positioning of the gear case.

It is to be understood that the form of my invention herewith shown and described is to be taken as a preferred example of the same, and that various changes in the shape, size and arrangement of parts may be resorted to without departing from the spirit of the invention or the scope of the subjoined claims.

It is to be noted that the distance between the center and bottom of the teeth 13 is equal to half the size of the straight gear 18 so that a silent shifting action can be accomplished.

Having thus described my invention, I claim:—

1. In a device of the character described, a pair of parallel spaced discs having teeth formed thereon, said teeth being arranged concentrically and at different diameters, a master gear slidable between said discs and adapted to successively engage the teeth formed on said discs, a driving gear engaging teeth formed on each of said discs, an idler gear engaging said last mentioned teeth, a shaft adapted to be driven and having said master gear slidably positioned thereon, means for manually moving said master gear through the compression of the clutch pedal on a motor vehicle.

2. In a device of the character described, the combination with a driving mechanism having a clutch associated therewith, a pedal adapted to operate said clutch, a gear mechanism remotely positioned with respect to said clutch mechanism, a pair of disc gears in axial alignment and spaced one from the other, a master gear slidable between said disc gears, and means for causing said master gear to engage teeth formed in said disc gears when said clutch pedal is actuated.

3. In combination with a motor vehicle having a clutch mechanism and a pedal adapted to actuate said clutch mechanism, a transmission positioned on said vehicle and including a pair of disc gears having teeth formed thereon, said teeth being arranged in concentrically ring formation, a driving gear positioned between said discs and adapted to engage one of the sets of teeth formed thereon, a master gear slidably positioned between said disc gears and adapted to be moved into engagement with said teeth formed on said discs in such a manner that the ratio will vary between said master gear and said disc gears, a yoke adapted to actuate said master gear, a sliding bar secured to said yoke, means connected to said sliding bar and to said clutch pedal for causing movement of said master gear when said clutch pedal is depressed.

In testimony whereof I affix my signature.

VINCENTE GARCIA MORENO.